США010111038B2

(12) United States Patent
Yamaguchi et al.

(10) Patent No.: US 10,111,038 B2
(45) Date of Patent: Oct. 23, 2018

(54) INTER-NETWORK CONNECTION CONTROL DEVICE, AND CONNECTION CONTROL METHOD

(71) Applicant: NTT DOCOMO, INC., Tokyo (JP)

(72) Inventors: Hiromasa Yamaguchi, Tokyo (JP); Subrata Biswas, Tokyo (JP); Akihide Sasabe, Tokyo (JP); Masataka Ikeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/316,532

(22) PCT Filed: Dec. 24, 2015

(86) PCT No.: PCT/JP2015/086037
§ 371 (c)(1),
(2) Date: Dec. 6, 2016

(87) PCT Pub. No.: WO2016/104608
PCT Pub. Date: Jun. 30, 2016

(65) Prior Publication Data
US 2017/0195850 A1 Jul. 6, 2017

(30) Foreign Application Priority Data

Dec. 25, 2014 (JP) .................................. 2014-263559

(51) Int. Cl.
*H04W 4/02* (2018.01)
*H04L 29/06* (2006.01)
(Continued)

(52) U.S. Cl.
CPC ....... *H04W 4/025* (2013.01); *H04L 29/06027* (2013.01); *H04L 47/12* (2013.01);
(Continued)

(58) Field of Classification Search
CPC ......... H04L 12/66; H04L 29/12; H04L 29/06; H04M 3/00; H04W 4/02
See application file for complete search history.

(56) References Cited

U.S. PATENT DOCUMENTS 7,969,967 B2 6/2011 Douglas et al.
2007/0258575 A1* 11/2007 Douglas .............. H04L 29/1216
379/221.13
2009/0190573 A1* 7/2009 Siegel ................. H04L 65/1016
370/352

FOREIGN PATENT DOCUMENTS

JP 2009-536501 A 10/2009

OTHER PUBLICATIONS

International Search Report issued in corresponding application No. PCT/JP2015/086037 dated Mar. 29, 2016 (3 pages).
(Continued)

*Primary Examiner* — Lakeram Jangbahadur
(74) *Attorney, Agent, or Firm* — Osha Liang LLP

(57) ABSTRACT

An inter-network connection control device used in an interconnected network includes a connection request signal forward unit that receives, from a call control device in a specific communication network, a connection request signal addressed to another communication network; an address query unit that queries an address resolution device for an address corresponding to a destination telephone number included in the connection request signal received from the connection request signal forward unit, and that obtains the address from the address resolution device; and a forward instruction unit that instructs the call control device to forward the connection request signal to the address obtained by the address query unit.

4 Claims, 8 Drawing Sheets

(51) Int. Cl.
   H04M 3/42       (2006.01)
   H04L 12/801     (2013.01)
   H04L 29/12      (2006.01)
(52) U.S. Cl.
   CPC ........ *H04L 61/157* (2013.01); *H04L 63/0414* (2013.01); *H04L 63/062* (2013.01); *H04L 63/065* (2013.01); *H04L 63/08* (2013.01); *H04L 63/10* (2013.01); *H04M 3/42229* (2013.01)

(56) References Cited

OTHER PUBLICATIONS

Written Opinion of the International Searching Authority issued in corresponding application No. PCT/JP2015/086037 dated Mar. 29, 2016 (4 pages).

3GPP TS 23.228 V13.0.0, "3rd Generation Partnership Project; Technical Specification Group Services and System Aspects; IP Multimedia Subsystem (IMS); Stage 2 (Release 13)"; Sep. 2014 (311 pages).

GSM Association, "DNS/ENUM Guidelines for Service Providers & GRX/IPX Providers"; Official Document IR.67, Version 4.1; Mar. 3, 2010 (76 pages).

GSM Association, "DNS and ENUM Guidelines for Service Providers and GRX and IPX Providers"; Official Document IR.67, Version 10.0; Apr. 24, 2014 (98 pages).

3GPP TS 24.229 V13.0.0, "3rd Generation Partnership Project; Technical Specification Group Core Network and Terminals; IP multimedia call control protocol based on Session Initiation Protocol (SIP) and Session Description Protocol (SDP); Stage 3 (Release 13)"; Dec. 2014 (858 pages).

Bradner et al., "The E.164 to Uniform Resource Identifiers (URI) Dynamic Delegation Discovery System (DDDS) Application (ENUM)"; Internet Engineering Task Force (IETF); Request for Comments: 6116; Mar. 2011 (22 pages).

* cited by examiner

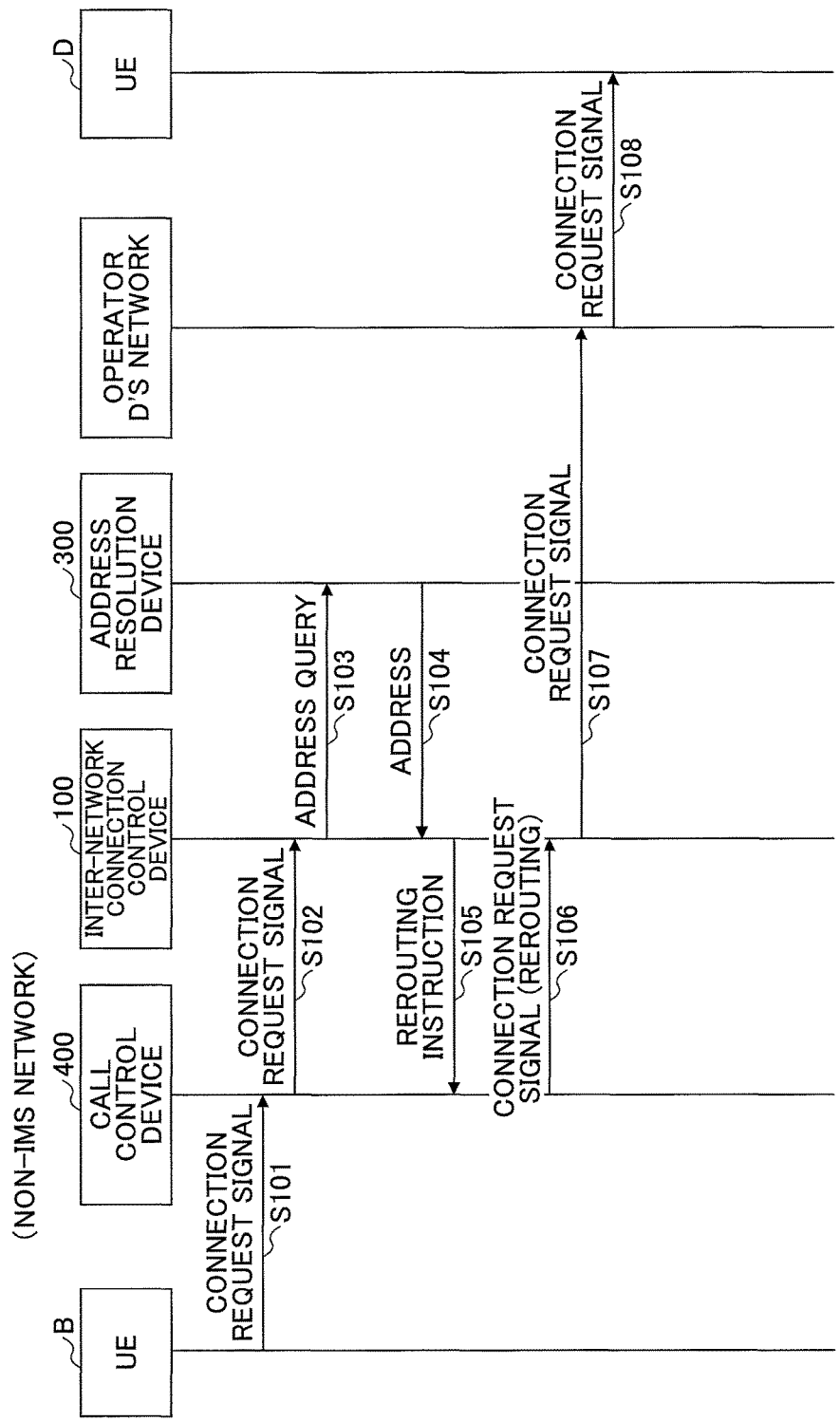

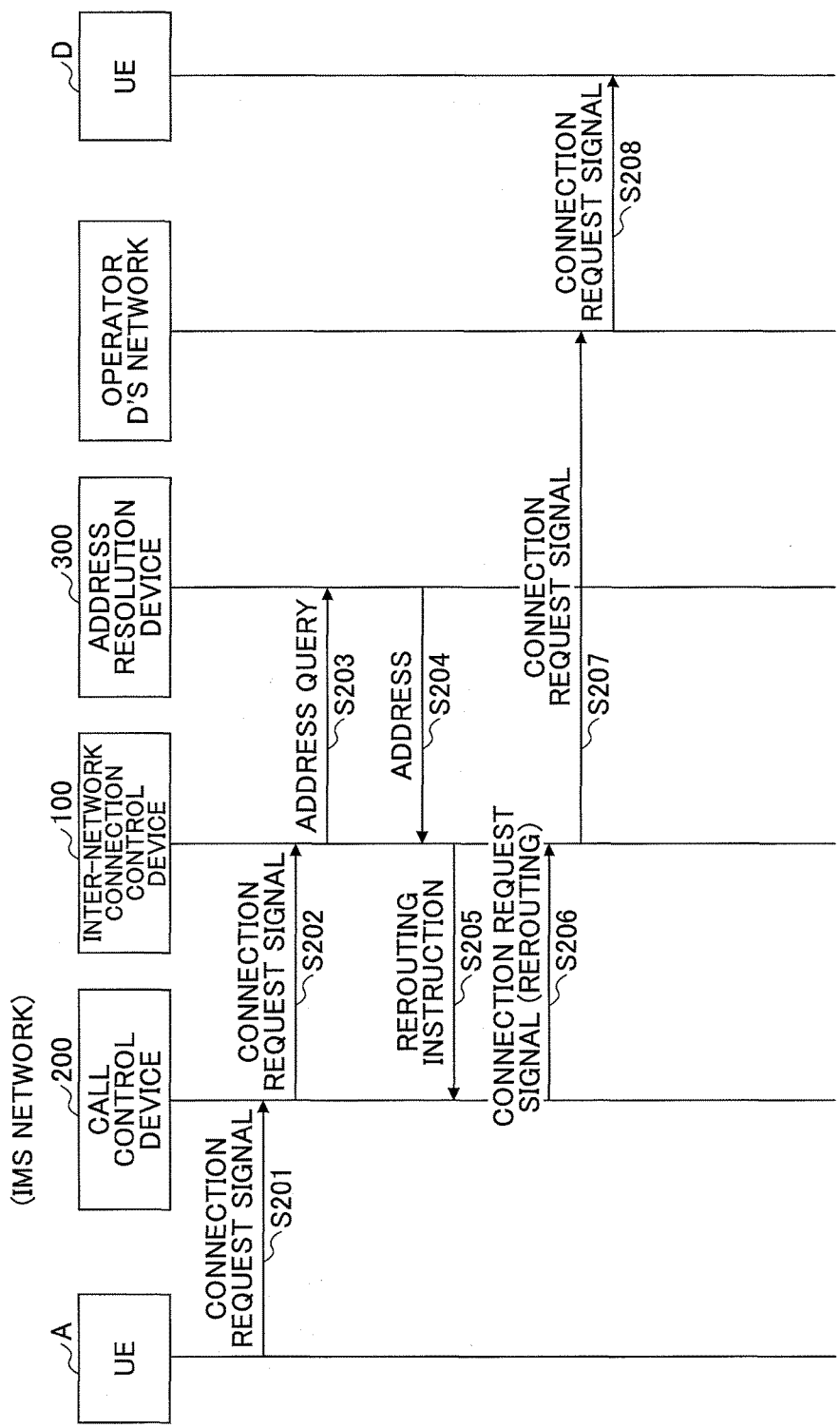

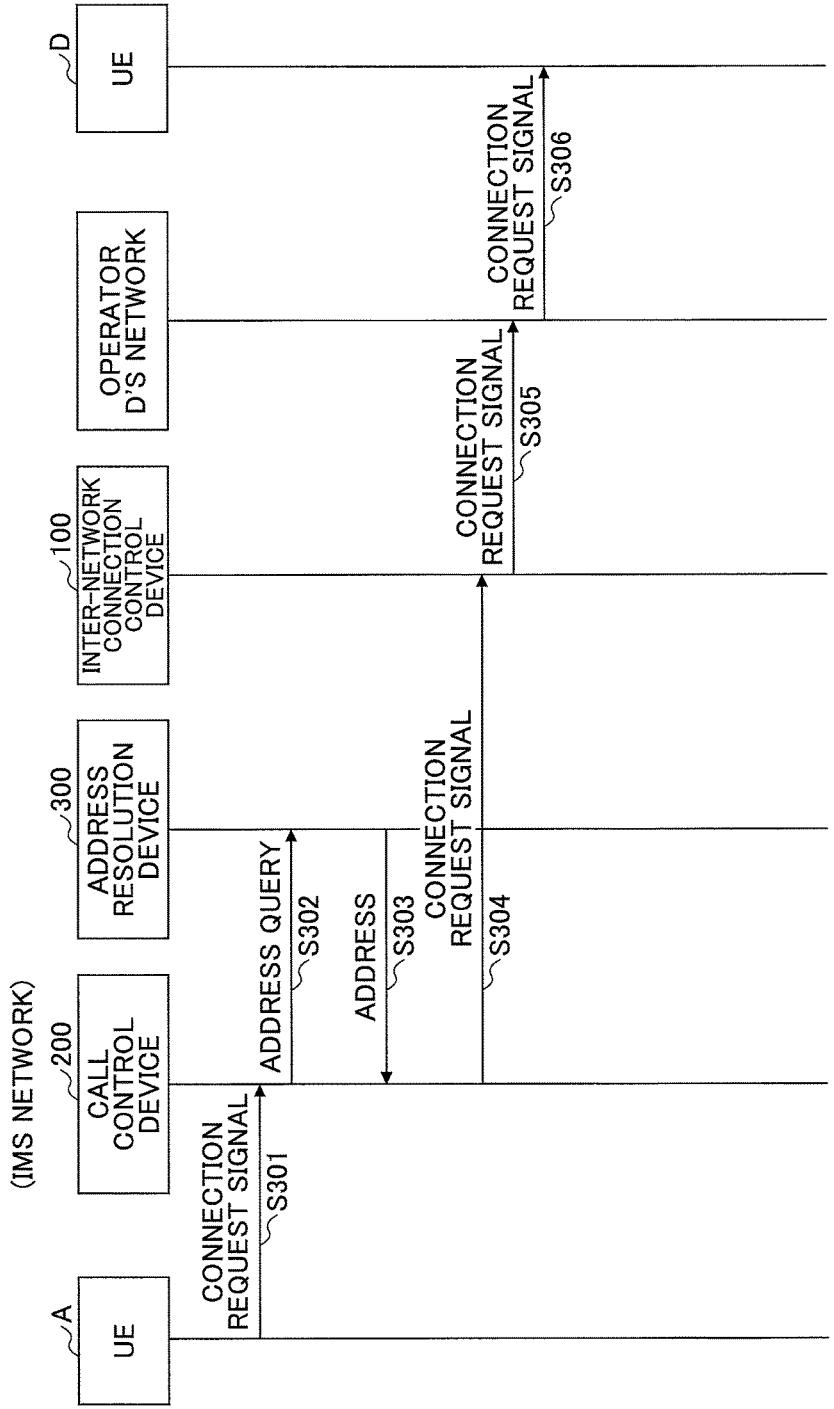

INTER-NETWORK CONNECTION CONTROL DEVICE, AND CONNECTION CONTROL METHOD

TECHNICAL FIELD

The present invention relates to an interconnection technique between communication networks.

BACKGROUND ART

As a platform through which a telecommunication carrier can flexibly and securely provide an IP multimedia service to a user, an IMS (IP Multimedia Subsystem) has been standardized (Non-Patent Document 1).

For example, a mobile network operator (which is referred to as an "operator," hereinafter) constructs an IP-based network (a core network) by the IMS to provide a mobile communication service to a user through an access network, such as those of an LTE/3G. Additionally, by establishing an IP interconnection (which is referred to as an "interconnection," hereinafter) between operators, communication between users subscribing to different operators is enabled.

PRIOR ART DOCUMENT

Non-Patent Document

Non-Patent Document 1: 3GPP TS 23.228 V13.0.0 (2014-09)

Non-Patent Document 2: GSMA PRD IR.67 (3 Mar. 2010)

SUMMARY OF INVENTION

Problem to be Solved by the Invention

FIG. 1 illustrates an example of a configuration for a case of establishing an interconnection between operator's networks. In the example illustrated in FIG. 1, an operator A's network that is a network of the operator A, an operator B's network that is a network of the operator B, an operator C's network that is a network of the operator C, and an operator D's network that is a network of the operator D are interconnected.

FIG. 1 is a diagram especially focusing on the operator A's network, and an inter-network connection control device 10 that is installed at a boundary portion of the operator A's network is illustrated; however, an inter-network connection control device may be installed at a boundary portion of another operator's network.

In the example of FIG. 1, the operator A's network is an IMS network; and the operator B's network is a non-IMS network. For example, the operator B's network is an IP centrex network for use within the company of the operator B. Note that, in the example illustrated here, it is assumed that the "IMS network" has an address resolution function, such as the ENUM (E.164 Number Mapping) function; and a network having no address resolution function, such as the ENUM function, is referred to as "non-IMS network."

Further, FIG. 1 illustrates a call control device 20 and a call control device 40 for controlling. These devices execute session control according to the SIP (Session Initiation Protocol). The call control device 20 of the operator A's network, which is the IMS network, is, for example, a device including a function of S-CSCF (Serving-Call Session Control Function) specified in the IMS.

As illustrated in FIG. 1, the address resolution device 30 is provided. The address resolution device 30 is, for example, an ENUM server (Non-Patent Document 2); and the call control device 20 of the operator A's network includes an ENUM client function for querying the ENUM server for an address. Note that, in Non-Patent Document 1, it is specified that the S-CSCF of the IMS includes the ENUM function.

By referring to FIG. 1, first, an example of a call connection procedure is illustrated for a case of establishing a call connection from a user A (UE-A), who is an operator A's subscriber, to a user D (UE-D), who is an operator D's subscriber. Here, it is assumed that the user D was originally an operator C's subscriber; however, due to the MNP (Mobile Number Portability), the user D becomes an operator D's subscriber. It is assumed that the address resolution device 30 recognizes that the telephone number of the user D is a telephone number for the operator D.

Upon an operation for originating a call to a user D's terminating number being made to the UE-A by the user A, a connection request signal that includes, as a destination, the user D's terminating number is transmitted (step 1). The connection request signal reaches the call control device 20. The call control device 20 queries the address resolution device 30 for the address of the user D's terminating number (which is a collective term for a URI, an IP address, and so forth); and the call control device 20 obtains the address of the user D's terminating number (step 2). The call control device 20 determines to forward the connection request signal to the operator D's network based on the address received from the address resolution device 30 at step 2; and the call control device 20 forwards the connection request signal to the operator D's network (step 3). In this manner, the connection request signal correctly reaches the user D (UE-D).

Next, an example of a call connection procedure is illustrated for a case of establishing a call connection from a user B (UE-B), who is an operator B's (the non-IMS network) subscriber, to the user D (UE-D), who is the operator D's subscriber. The call control device 40 of the operator B's network, which is the non-IMS network, is incapable of using the ENUM function.

Upon an operation for originating a call to the user D's terminating number being made to the UE-B by the user B, a connection request signal that includes, as a destination, the user D's terminating number is transmitted (step 11). The connection request signal reaches the call control device 40. The call control device 40 determines that the destination of the connection request signal is the operator C's network based on the user D's terminating number; and the call control device 40 forwards the connection request signal to the operator C's network (step 12). However, since the user D's terminating number is a number of the user who moves out to the operator D based on the MNP, in the operator C's network, a determination is made that the connection request signal is not addressed to the operator C, and an error response is returned (steps 13 and 14).

As described above, in an existing inter-network connection control method, there is a problem that a case arises where a call connection may not be established from a network (e.g., a VoIP based SIP network, such as the IP centrex network) not including an address resolution function, such as the ENUM function, to another network.

The present invention is achieved in view of the above-described point, and an object is to provide, in an interconnected network where a plurality of communication networks are mutually connected, a technique for allowing a call connection from a communication network not including an address resolution function, such as the ENUM function, to another communication network to be properly established.

Means for Solving the Problem

According to an embodiment of the present invention, there is provided an inter-network connection control device used in an interconnected network, the inter-network connection control device including a connection request signal forward unit that receives, from a call control device in a specific communication network, a connection request signal addressed to another communication network; an address query unit that queries an address resolution device for an address corresponding to a destination telephone number included in the connection request signal received from the connection request signal forward unit, and that obtains the address from the address resolution device; and a forward instruction unit that instructs the call control device to forward the connection request signal to the address obtained by the address query unit.

Further, according to an embodiment of the present invention, there is provided a connection control method to be executed by an inter-network connection control device used in an interconnected network, the connection control method including an address query step of receiving, from a call control device in a specific communication network, a connection request signal addressed to another communication network, querying an address resolution device for an address corresponding to a destination telephone number included in the connection request signal, and obtaining the address from the address resolution device; and a forward instruction step of instructing the call control device to forward the connection request signal to the address obtained in the address query step.

Furthermore, according to an embodiment of the present invention, there is provided a connection control method to be executed by a communication system including an inter-network connection control device to be used in an interconnected network, and a call control device included in a specific communication network in the interconnected network, the connection control method including a step, by the call control device, of receiving a connection request signal transmitted from user equipment; a step, by the call control device, of transmitting the connection request signal to another network, based on a destination telephone number included in the connection request signal; an address query step, by the inter-network connection control device, of receiving the connection request signal, querying an address resolution device for an address corresponding to the destination telephone number included in the connection request signal, and obtaining the address from the address resolution device; a forward instruction step, by the inter-network connection control device, of instructing the call control device to forward the connection request signal to the address obtained in the address query step; and a step, by the call control device, of forwarding the connection request signal to the address in accordance the instruction.

Advantage of the Invention

According to the embodiment of the present invention, there is provided, in an interconnected network where a plurality of communication networks are mutually connected, a technique for allowing a call connection from a communication network not including an address resolution function, such as the ENUM function, to another communication network to be properly established.

BRIEF DESCRIPTION OF DRAWINGS

FIG. 6 is a diagram illustrating an example 1 of a connection sequence;

FIG. 7 is a diagram illustrating an example 2 of the connection sequence; and FIG. 8 is a diagram illustrating an example 3 of the connection sequence.

EMBODIMENTS OF THE INVENTION

Figure 1:
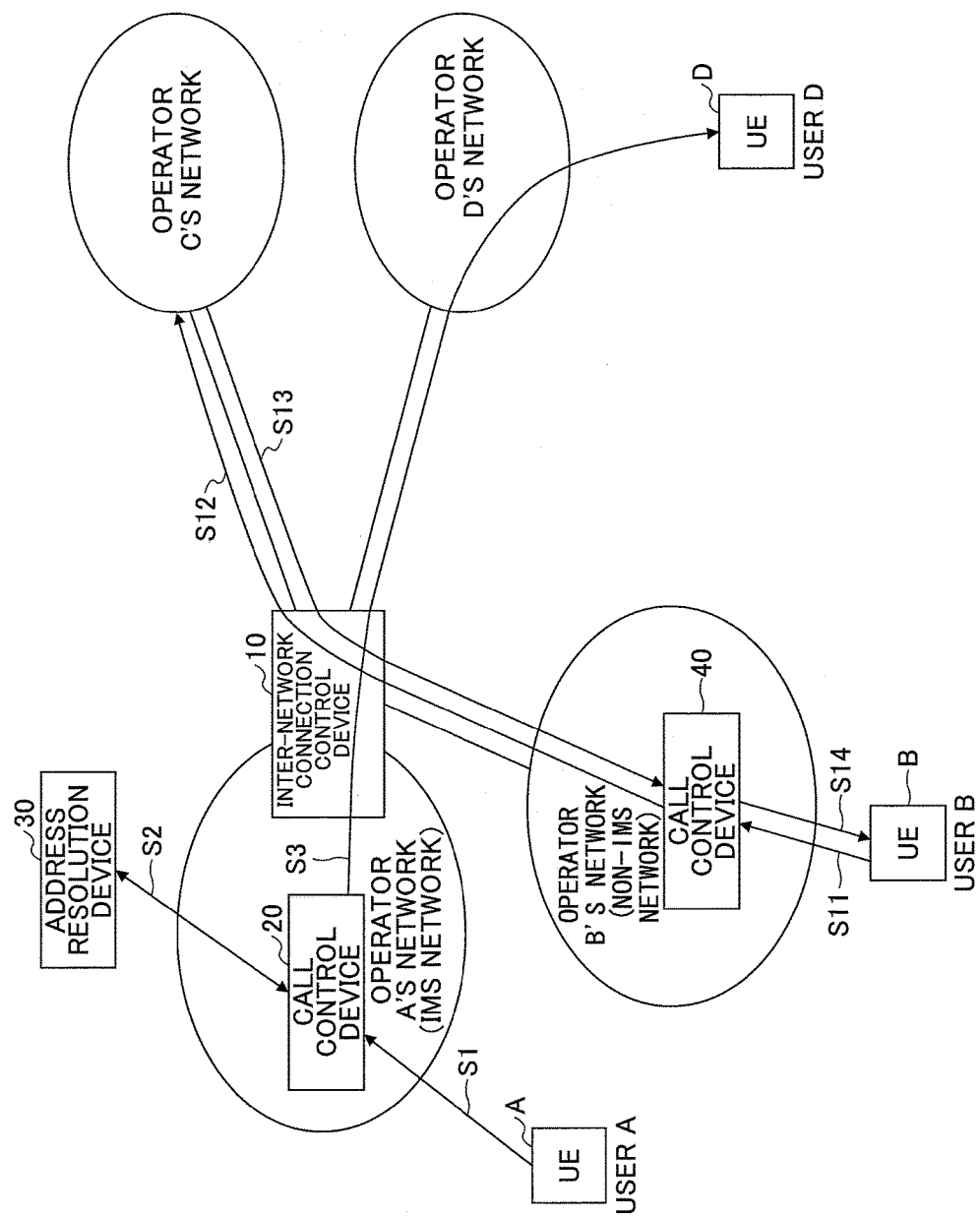
FIG. 1 is a diagram illustrating a problem.

An embodiment of the present invention is described below by referring to the drawings. However, the embodiment described below is merely an example; and embodiments to which the present invention is applied are not limited to the embodiment described below. For example, it is assumed that each operator's network described below is a core network of a mobile network operator; however, the present invention is applicable regardless of whether the operator's network is the core network. For example, an operator's network may be a fixed telephone network. Further, the MNP (Mobile Number Portability) used in the description below is an example, and different NP (Number Portability), such as LNP (Local Number Portability) may be used.

(Overall Structure of the System)

Figure 2:
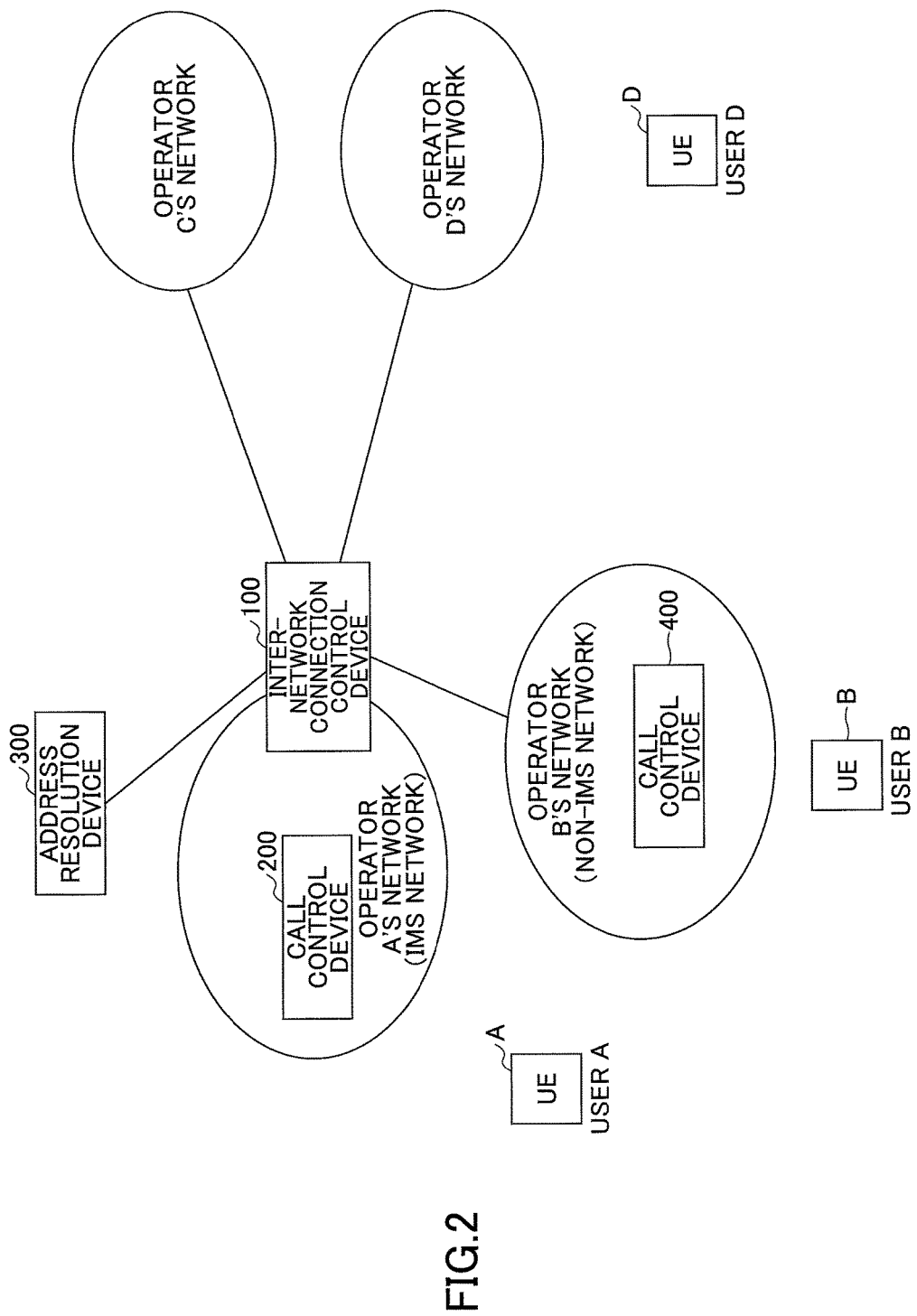
FIG. 2 is an overall configuration diagram of a system according to an embodiment of the present invention.

FIG. 2 is a diagram illustrating an example of a configuration of an IP interconnection network (which is referred to as the "interconnection network," hereinafter) in the embodiment. As a connection configuration between operator's networks, the network configuration illustrated here is the same as the configuration illustrated in FIG. 1.

Namely, the interconnection network illustrated in FIG. 2 is a network where an operator A's network that is a network of an operator A, an operator B's network that is a network of an operator B, an operator C's network that is a network of an operator C, and an operator D's network that is a network of an operator D are interconnected. Each operator's network is a communication network where session control is executed by the SIP (Session Initiation Protocol).

FIG. 2 is a diagram where the operator A's network is especially focused on, and an inter-network connection control device 100 is illustrated, which is installed at a boundary portion of the operator A's network. However, an inter-network connection control device may be installed at a boundary portion of another operator's network.

Additionally, in the example of FIG. 2, the operator A's network is an IMS network; and the inter-network connection control device 100 includes, for example, a function of the IBCF (Interconnection Border Control Function) and/or a function of the BGCF (Breakout Gateway Control Function).

The operator B's network is a non-IMS network; and the operator B's network is an IP centrex network for use within the company of the operator B, for example. In the embodiment, it is also assumed, as described above, that the "IMS network" has an address resolution function, such as the ENUM function, and that the network that does not include the address resolution function, such as the ENUM function, is the "non-IMS network."

Furthermore, as devices for executing session control by the SIP, the operator A's network is provided with a call control device 200; and the operator B's network is provided with a call control device 400. The call control device 200 of the operator A's network, which is the IMS network, is, for example, a device including a function of the S-CSCF specified in the IMS; however, the call control device 200 is not limited to this.

As illustrated in FIG. 2, the system according to the embodiment includes an address resolution device 300. The address resolution device 300 is, for example, an ENUM (Non-Patent Document 2) server. In the embodiment, the address resolution device 300 may be installed anywhere, provided that the address resolution device 300 can communicate with the inter-network connection control device 100. For example, it can be installed within the operator A's network; or it can be installed at a predetermined location (address) on the Internet, which does not belong to an operator's network related to the interconnection. Note that, in the embodiment, the inter-network connection control device 100 is also capable of communicating with the call control device 200.

In the embodiment, the inter-network connection control device 100 includes a function for querying the address resolution device 300 for an address corresponding to a phone number so as to obtain the address. The function is, for example, a ENUM client function; and the address is, for example, a SIP URI or an IP address. Note that the address is not limited to these, and the address may be different information.

The call control device 200 of the operator A's network may or may not include a function for querying the address resolution device 300 for an address corresponding to the phone number to obtain the address.

(Device Configuration)

Next, an example of configurations of the inter-network connection control device 100 and the address resolution device 300 in the above-described system is described.

<The Inter-Network Connection Control Device 100>

Figure 3:
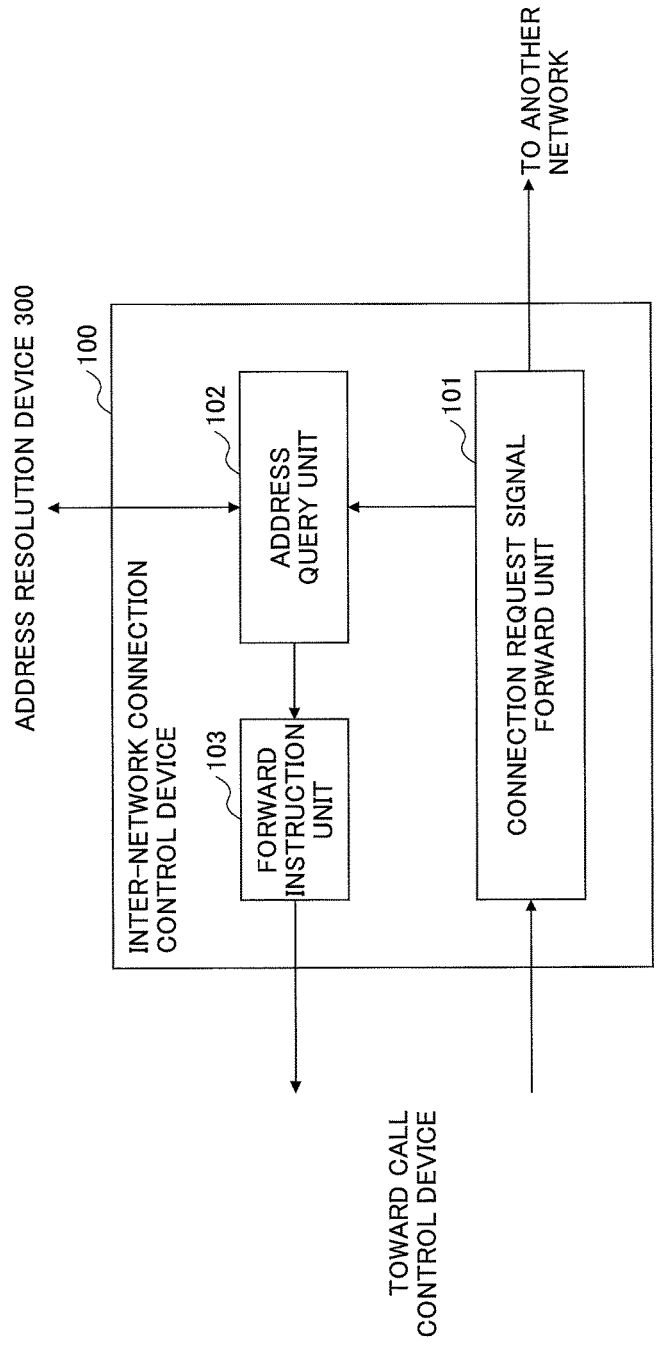
FIG. 3 is a functional configuration diagram of an inter-network connection control device 100.

FIG. 3 illustrates a functional configuration diagram of the inter-network connection control device 100 according to the embodiment. As illustrated in FIG. 3, the inter-network connection control device 100 includes a connection request signal forward unit 101; an address query unit 102; and a forward instruction unit 103.

Note that FIG. 3 illustrates, in the inter-network connection control device 100, only functional units that are particularly related to the embodiment of the present invention; and the inter-network connection control device 100 may include a function, which is not depicted, for executing an operation to establish a connection between the operator's networks. Furthermore, the functional configuration illustrated in FIG. 3 is merely an example. The functional division and the names of the functional units can be any functional division and any names, provided that the operation according to the embodiment can be executed.

The connection request signal forward unit 101 includes a function for receiving a connection request signal that is transmitted from a UE (user equipment) and forwarded by a call control device in the operator's network, and for forwarding the connection request signal to another network in accordance with an address of the connection request signal. The request signal forwarding unit 101 may include, for example, a function to execute conversion of a SIP message, so as to absorb a difference of the SIP message between operators.

Additionally, the connection request signal forward unit 101 includes a function for instructing, upon receiving the connection request signal routed (forwarded) from the call control device for the first time, the address query unit 102 to query for an address corresponding to the destination telephone number included in the connection request signal. However, for a case where the connection request signal is routed based on the address obtained from the address resolution device 300, the connection request signal is forwarded to the destination without querying for the address.

The address query unit 102 corresponds, for example, to the ENUM client function; and the address query unit 102 includes a function for obtaining, based on a telephone number (example: Tel: an E. 164 address in a Request-URI in a URI format) included in a connection request signal, an address corresponding to the telephone number (example: a SIP routable SIP URI) by querying the address resolution device 300, and for passing the obtained result to the forward instruction unit 103.

The forward instruction unit 103 includes a function for returning, to the call control device that is queried for the address and that is a forward destination of the connection request signal, a rerouting instruction signal for instructing to forward (reroute) the connection control signal to the address obtained by the address query unit 102. Instead of transmitting such an explicit rerouting instruction signal, transmission of an address may be regarded as performing the rerouting instruction.

The inter-network connection control device 100 according to the embodiment can be implemented, for example, by causing one or a plurality of computers (servers) to execute a program in which processing details described in the embodiment are described. Namely, the functions included in the inter-network control device 100 can be implemented by executing a program corresponding to the process to be executed by the inter-network control device 100 by using hardware resources included in the computer, such as a CPU and a memory. Further, the above-described program may be stored in a computer readable recording medium (e.g., a portable memory), so that the above-described program is to be saved, or to be distributed. Furthermore, the above-described program may be provided through a network, such as by the Internet or by an e-mail.

Figure 4:
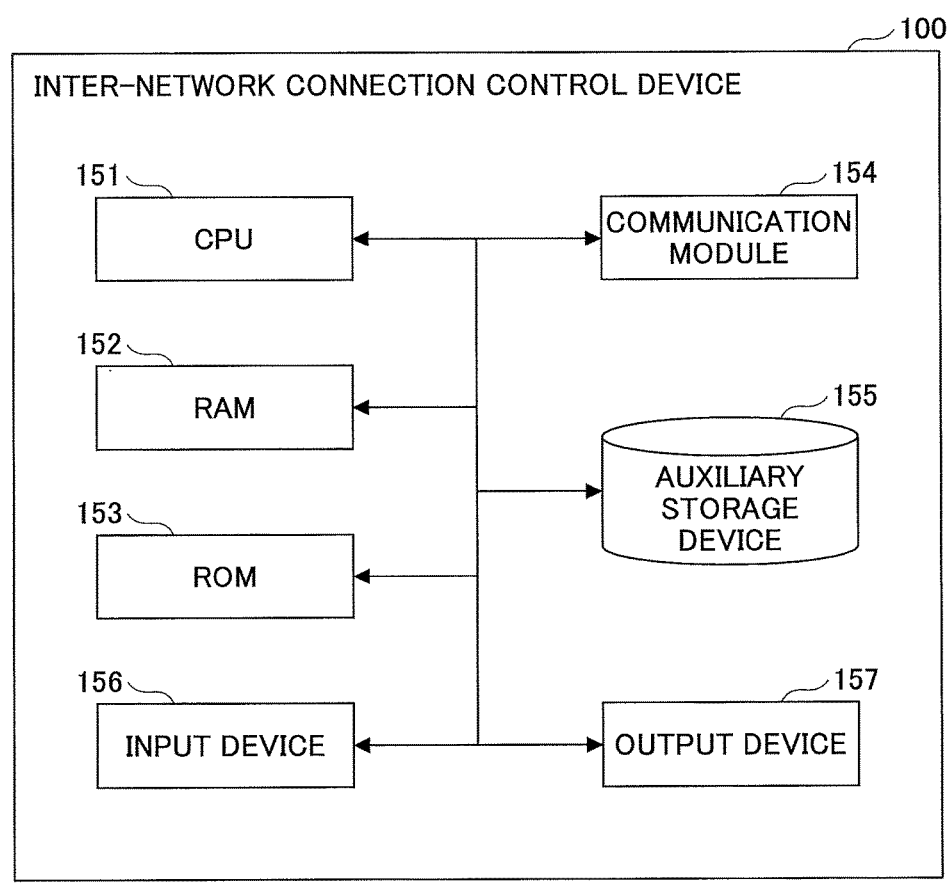
FIG. 4 is a diagram illustrating an example of a hardware configuration of the inter-network connection control device 100.

An example of a hardware configuration of the inter-network connection control device 100 is illustrated in FIG. 4 for a case where the inter-network connection control device 100 is formed of the above-described computer.

As illustrated in FIG. 4, the inter-network connection control device 100 includes a CPU 151; a RAM (Random Access Memory) 152; a ROM (Read Only Memory) 153; a communication module 154 for executing communication; an auxiliary storage device 155, such as a hard disk; an input device 156; and an output device 157.

The operation of each of the functions of the connection request signal forward unit 101, the address query unit 102, and the forward instruction unit 103 is executed by reading out and executing, by the CPU 151, the program stored in a storage unit, such as the RAM 152, the ROM 153, or the auxiliary storage device 155. Further, among the processes by each of the functional units of the connection request signal forward unit 101, the address query unit 102, and the forward instruction unit 103, for a process for which network communication is to be executed, the communication module 154 is used. Furthermore, by the input device 156, for example, setting information can be input to the inter-network connection control device 100; and by the output device 157, for example, an operation condition of the inter-network connection control device 100 can be output.

<The Address Resolution Device 300>

Figure 5:
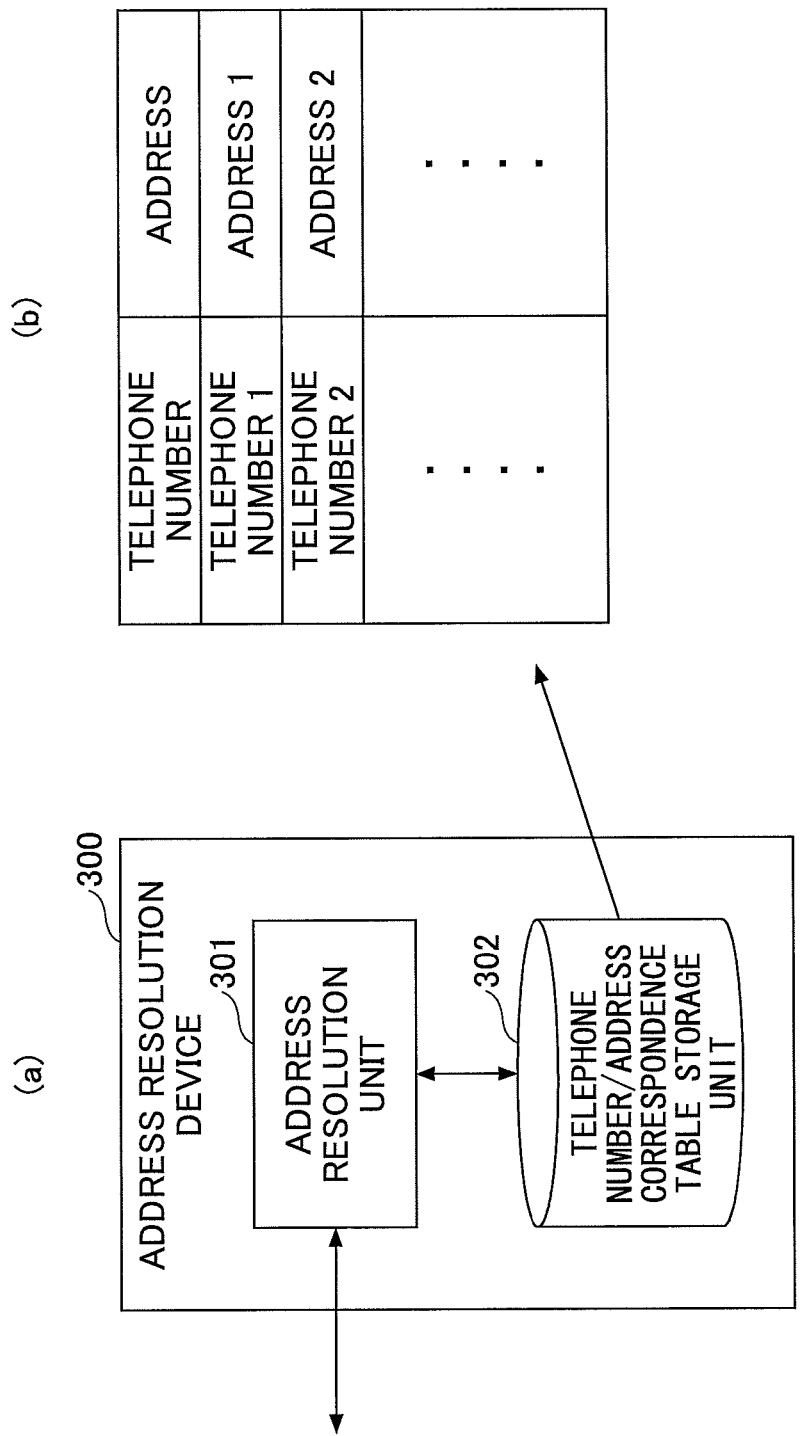
FIG. 5 is a functional configuration diagram of an address resolution device 300.

FIG. 5 illustrates a functional configuration diagram of the address resolution device 300 according to the embodiment. As illustrated in FIG. 5(a), the address resolution device 300 includes an address resolution unit 301; and a telephone number/address correspondence table storage unit 302.

Note that FIG. 5 illustrates, in the address resolution device 300, only functional units that are particularly related to the embodiment of the present invention; and the address resolution device 300 also includes a function, which is not depicted, for actually executing an operation. Furthermore, the functional configuration illustrated in FIG. 5 is merely an example. The functional division and the names of the functional units can be any functional division and any names, provided that the operation according to the embodiment can be executed.

As illustrated in FIG. 5(b), the telephone number/address correspondence table storage unit 302 stores a correspondence table (table) where a telephone number and an address are associated.

In the embodiment, a telephone number that is set in the table is, for example, a telephone number of a user (UE) accommodated by (subscribing to) an operator's network, which is interconnected with the operator A's network.

For example, for a case where the operator A's network, the operator C's network, and the operator D's network are interconnected, in the telephone number/address correspondence table storage unit 302, an address representing the operator D's network is stored, as an address corresponding to a telephone number (which was originally a number within the operator C) of a user who moves out from the operator C to the operator D based on the MNP.

Here, the above-described example is for the information that is required for a case of originating from the operator A's network; however, for each operator's network, a similar correspondence table may be stored. Additionally, a correspondence table may be provided that stores information that can be commonly used by the operators.

It suffices if the "address" recorded in the correspondence table is an address with which it can be found which operator is the forwarding address to which the connection request signal is to be forwarded; and it is not necessary that the "address" is an address with which the terminating UE can be identified. However, it can be an address with which the terminating UE can be identified.

Upon receiving, from the inter-network connection control device 100, a query signal (example: ENUM Query) specifying a destination telephone number, the address resolution unit 301 searches for an address corresponding to the destination telephone number in the corresponding table in the telephone number/address correspondence table storage unit 302; and if the address corresponding to the destination telephone number is found, the address resolution unit 301 returns it to the inter-network connection control device 100; and if the address corresponding to the destination telephone number is not found, the address resolution unit 301 executes a process of returning information indicating that the address does not exist in the correspondence table to the inter-network connection control device 100.

The address resolution device 300 according to the embodiment can be implemented, for example, by causing one or a plurality of computers (servers) to execute a program in which processing details described in the embodiment are described. Namely, the functions included in the address resolution device 300 can be implemented by executing a program corresponding to the process to be executed by the address resolution device 300 by using hardware resources included in the computer, such as a CPU and a memory. Further, the above-described program may be stored in a computer readable recording medium (e.g., a portable memory), so that the above-described program is to be saved, or to be distributed. Furthermore, the above-described program may be provided through a network, such as by the Internet or by an e-mail.

Here, a hardware configuration of the address resolution device 300 for a case of configuring the address resolution device 300 by a computer, such as the above-described computer, is the same as the case of configuring the inter-network connection control device 100 by the computer; and it is as illustrated in FIG. 4.

(Example of Operation of the System)

<Example 1 of a Connection Sequence>

Next, an example 1 of a connection sequence is described, as an example of operation of the system according to the embodiment, by referring to FIG. 6. The example 1 of the connection sequence is an example of the sequence for a case where a call connection is to be established from a user B (UE-B) of the operator B's network (a non-IMS network) to a user D (UE-D) of the operator D's network.

Here, it is assumed that the user D was originally a subscriber of the operator C; and that the user D becomes a subscriber of the operator D based on the MNP. The address resolution device 300 recognizes that the telephone number of the user D is a telephone number for the operator D. This point is the same for examples 2 and 3 of the connection sequence.

Upon the user B performing, in the UE-B, an operation for originating to a user D's terminating number, a connection request signal including, as a destination, the user D's terminating number is transmitted (Step 101). The connection request signal reaches a call control device 400. The call control device 400 determines that the destination telephone number of the connection request signal is a telephone number of the operator C; and the call control device 400 transmits the connection request signal to the operator C's network, as a destination (Step 102). In the embodiment, the connection request signal, which is transmitted to another network from the operator A's network/operator B's network connected to the other network through the inter-network connection control device 100, is always transferred to the inter-network connection control device 100.

Thus, the connection request signal that is transmitted from the call control device 400 at Step 102 reaches the inter-network connection control device 100.

Upon determining, in the inter-network connection control device 100 receiving the connection request signal, that the connection request signal is not for rerouting, but for routing for a first time, the connection request signal forward unit 101 instructs the address query unit 102 to obtain an address corresponding to the user D's terminating number, which is included in the connection request signal.

Note that the method of determining that the connection request signal is not for rerouting, but for routing for the first time is not limited to a specific method. As an example, by including, by the call control device 400 transmitting the connection request signal, identifying information indicating whether it is for rerouting or for routing for the first time in the connection request signal, the connection request signal forward unit 101 can make a determination based on the identifying information. Additionally, upon receiving the connection request signal including an originating source telephone number in the connection request signal received for the first time, an originating source telephone number that is the same as the destination telephone number, and the destination telephone number within a predetermined time period, the connection request signal forward unit 101 may determine that it is the connection request signal for rerouting.

Subsequently, the address query unit 102 of the inter-network connection control device 100 transmits, to the address resolution device 300, an address query signal including the user D's terminating number (Step 103). In the address resolution device 300 that receives the address query signal, the address resolution unit 301 obtains an address corresponding to the user D's terminating number by referring to the telephone number/address correspondence table storage unit 302; and the address resolution unit 301 returns the address to the inter-network connection control device 100 (Step 104).

In the inter-network connection control device 100 that receives the address, the address query unit 102 passes the address to the forward instruction unit 103; and the forward instruction unit 103 transmits, to the call control device 400, a rerouting instruction signal for instructing to reroute the connection request signal toward the address (Step 105).

Upon receiving the rerouting instruction signal, the call control device 400 transmits the connection request signal to the address (the address of the operator D's network), as the destination of the connection request signal (Step 106). Namely, the connection request signal is rerouted toward the operator D's network.

In the inter-network connection control device 100 that receives the rerouted connection request signal, upon determining that the connection request signal is for rerouting, the connection request signal forward unit 101 transmits the connection request signal toward the operator D's network (Step 107). The connection request signal is forwarded within the operator D's network, and reaches the UE-D (Step 108). After that, a call session is established between the UE-B and the UE-D through a predetermined SIP procedure; and a call is started between the users.

<Example 2 of the Connection Sequence>

Next, an example 2 of the connection sequence is described, as an example of the operation of the system according to the embodiment, by referring to FIG. 7. The example 2 of the connection sequence is an example of the sequence for a case where a call connection is to be established from a user A (UE-A) of the operator A's network (an IMS network) to the user D (UE-D) of the operator D's network. In this example, it is assumed that the call control device 200 in the operator A's network does not include a function (example: ENUM function) to obtain an address corresponding to the terminating number from the address resolution device 300, or that, even if the function is included, the operation is turned off.

Upon the user A performing, in the UE-A, an operation for originating to the user D's terminating number, a connection request signal including, as a destination, the user D's terminating number is transmitted (Step 201). The connection request signal reaches the call control device 200. The call control device 200 determines that the destination telephone number of the connection request signal is the telephone number of the operator C; and the call control device 200 transmits the connection request signal to the operator C's network, as a destination (Step 202). The connection request signal that is transmitted from the call control device 200 at Step 202 reaches the inter-network connection control device 100.

Upon determining, in the inter-network connection control device 100 receiving the connection request signal, that the connection request signal is not for rerouting, but for routing for a first time, the connection request signal forward unit 101 instructs the address query unit 102 to obtain the address corresponding to the user D's terminating number, which is included in the connection request signal.

Here, as described below, for a case where the inter-network connection control device 100 recognizes that the call control device 200 may transmit the connection request signal through rerouting, which is based on the address obtained from the address resolution device 300, after Step 202, the inter-network control device 100 determines that the received connection request signal is not the connection request signal transmitted through rerouting based on the address obtained from the address resolution device 300; and the inter-network connection control device 100 instructs the address query unit 102 to obtain the address corresponding to the user D's terminating number, which is included in the connection request signal.

Note that the method of determining that the received connection request signal is the connection request signal transmitted through routing, which is based on the address obtained from the address resolution device 300, is not limited to a specific method. For example, for a case where the call control device 200 transmits the connection request signal through routing, which is based on the address obtained from the address resolution device 300, by including identifying information indicating it in the connection request signal, the inter-network connection control device 100 can determine that the connection request signal is transmitted through routing, which is based on the address obtained from the address resolution device 300.

Subsequently, the address query unit 102 of the inter-network connection control device 100 transmits, to the address resolution device 300, an address query signal including the user D's terminating number (Step 203). In the address resolution device 300 that receives the address query signal, the address resolution unit 301 obtains the address corresponding to the user D's terminating number by referring to the telephone number/address correspondence table storage unit 302; and the address resolution unit 301 returns the address to the inter-network connection control device 100 (Step 204).

In the inter-network connection control device 100 that receives the address, the address query unit 102 passes the address to the forward instruction unit 103; and the forward instruction unit 103 transmits, to the call control device 200, a rerouting instruction signal for instructing to reroute the connection request signal toward the address (Step 205).

Upon receiving the rerouting instruction signal, the call control device 200 transmits the connection request signal to the address (the address of the operator D's network), as the destination of the connection request signal (Step 206). Namely, the connection request signal is rerouted toward the operator D's network.

In the inter-network connection control device 100 that receives the rerouted connection request signal, upon determining that the connection request signal is for rerouting, the connection request signal forward unit 101 transmits the connection request signal toward the operator D's network (Step 207). The connection request signal is forwarded within the operator D's network, and reaches the UE-D (Step 208). After that, a call session is established between the UE-A and the UE-D through a predetermined SIP procedure; and a call is started between the users.

<Example 3 of the Connection Sequence>

Next, an example 3 of the connection sequence is described, as an example of the operation of the system according to the embodiment, by referring to FIG. 8. The example 3 of the connection sequence is an example of the sequence for a case where a call connection is to be established from a user A (UE-A) of the operator A's network (an IMS network) to the user D (UE-D) of the operator D's network. In this example, it is assumed that the call control device 200 in the operator A's network includes a function (example: ENUM function) to obtain an address corresponding to the terminating number from the address resolution device 300, and that the operation of the function is turned on.

Upon the user A performing, in the UE-A, an operation for originating to the user D's terminating number, a connection request signal including, as a destination, the user D's terminating number is transmitted (Step 301). The connection request signal reaches the call control device 200.

The call control device 200 transmits an address query signal including the user D's terminating number to the address resolution device 300 (Step 302). In the address resolution device 300 that receives the address query signal, the address resolution unit 301 obtains the address corresponding to the user D's terminating number by referring to the telephone number/address correspondence table storage unit 302; and the address resolution unit 301 returns the (Step 303).

Upon receiving the address, the call control device 200 transmits the connection request signal to the address (the address of the operator D's network), as the destination of the connection request signal (Step 304). Namely, the connection request signal is rerouted toward the operator D's network. The connection request signal transmitted from the call control device 200 at Step 304 reaches the inter-network connection control device 100.

In the inter-network connection control device 100 that receives the connection request signal, the connection request signal forward unit 101 determines that the connection request signal is transmitted through routing, which is based on the address obtained from the address resolution device 300; and the connection request signal is transmitted toward the operator D's network, without executing the process for obtaining the address from the address resolution device 300 (Step 305). The connection request signal is forwarded within the operator D's network, and reaches the UE-D (Step 306). After that, a call session is established between the UE-A and the UE-D through a predetermined SIP procedure; and a call is started between the users.

As described above, according to an embodiment of the present invention, there is provided an inter-network connection control device used in an interconnected network, the inter-network connection control device including a connection request signal forward unit that receives, from a call control device in a specific communication network, a connection request signal addressed to another communication network; an address query unit that queries an address resolution device for an address corresponding to a destination telephone number included in the connection request signal received from the connection request signal forward unit, and that obtains the address from the address resolution device; and a forward instruction unit that instructs the call control device to forward the connection request signal to the address obtained by the address query unit.

By configuring the inter-network connection control device as described above, in an interconnected network where a plurality of communication networks is connected, a call connection from a communication network not including an address resolution function, such as the ENUM function, to another communication network can be properly established.

For a case where the connection request signal received from the call control device is forwarded based on an instruction by the forward instruction unit, the connection request signal forward unit may forward the connection request signal to the other communication network. With this configuration, it can be avoided, for the connection request signal for which the address has already been obtained from the address resolution device, to perform an operation for obtaining the address from the address resolution device again.

For a case where the connection request signal received from the call control device is forwarded based on the address obtained from the address resolution device, the connection request forward unit may forward the connection request signal to the other communication network. With this configuration, it can be avoided, for the connection request signal for which the address has already been obtained from the address resolution device, to perform an operation for obtaining the address from the address resolution device again.

For example, the interconnected network is a network where communication networks, in each of which session control by the SIP is executed, are interconnected, and the inter-network connection control device is installed at a boundary portion of the network. In this manner, by setting, as a target, a communication network where session control by the SIP is executed, for example, the present invention can be effectively applied to the IMS network and other SIP networks.

For example, the above-described telephone number is a telephone number conforming to E. 164; and the above-described address is a SIP URI or an IP address. With this configuration, for example, an ENUM server can be used as an address resolution device.

The embodiment of the present invention is described above; however the disclosed invention is not limited to such an embodiment, and a person ordinarily skilled in the art will appreciate various variations, modifications, alternatives, replacements, and so forth. Specific examples of numerical values are used in the description in order to facilitate understanding of the invention. However, these numerical values are merely an example, and any other appropriate values may be used, except as indicated otherwise. The separations of the items in the above description are not essential to the present invention. Depending on necessity, subject matter described in two or more items may be combined and used, and subject matter described in an item may be applied to subject matter described in another item (provided that they do not contradict). A boundary of a functional unit or a processor in the functional block diagrams may not necessarily correspond to a boundary of a physical component. An operation by a plurality of functional units may be physically executed by a single component, or an operation of a single functional unit may be physically executed by a plurality of components. For the convenience of explanation, each device is described by using the functional block diagrams. However, each device may be implemented in hardware, software, or combinations thereof. The software to be operated by the processor included in each device in accordance with the embodiment of the present invention may be stored in any appropriate storage medium, such as a random access memory (RAM), a flash memory, a read-only memory (ROM), an EPROM, an EEPROM, a register, a hard disk drive (HDD), a removable disk, a CD-ROM, a database, a server, and so forth.

This patent application is based upon and claims the benefit of priority of Japanese Patent Application No. 2014-263559 filed on Dec. 25, 2014, and the entire contents of Japanese Patent Application No. 2014-263559 are incorporated herein by reference.

The present invention is not limited to the above-described embodiment; and various variations, modifications, alternatives, replacements, and so forth are included in the present invention without departing from the spirit of the present invention.

LIST OF REFERENCE SYMBOLS

10: inter-network connection control device
20: call control device
30: address resolution device
40: call control device
100: inter-network connection control device
101: connection request signal forward unit
102: address query unit
103: forward instruction unit
151: CPU
152: RAM
153: ROM
154: communication module
155: auxiliary storage device
156: input device
157: output device
200: call control device
300: address resolution device
301: address resolution unit
302: telephone number/address correspondence table storage unit
400: call control device

The invention claimed is:

1. An inter-network connection control device used in an interconnected network, the inter-network connection control device comprising:
a receiver that receives, from a call control device in a specific communication network, a connection request signal addressed to another communication network;
a transmitter that transmits a query to an address resolution device for an address corresponding to a destination telephone number included in the connection request signal received,
wherein:
the receiver receives the address from the address resolution device and
the transmitter transmits an instruction to the call control device to forward the connection request signal to the address obtained from the address resolution device, and
wherein, when the connection request signal received from the call control device is forwarded based on the instruction from the inter-network connection control device, the transmitter transmits the connection request signal to the other communication network,
wherein in each network of the interconnected network, session control is executed by a Session Initial Protocol (SIP) and the inter-network connection control device is installed at a boundary portion of a communication network of the interconnected network, and
wherein the telephone number is a telephone number conforming to E. 164, and the address is a SIP Uniform Resource Identifier (URI) or an IP address.

2. The inter-network connection control device according to claim 1, wherein, when the connection request signal received from the call control device is forwarded based on the address obtained from the address resolution device, the transmitter transmits the connection request signal to the other communication network.

3. A connection control method to be executed by an inter-network connection control device used in an interconnected network, the connection control method comprising:
receiving, from a call control device in a specific communication network, a connection request signal addressed to another communication network,
querying an address resolution device for an address corresponding to a destination telephone number included in the connection request signal,
obtaining the address from the address resolution device in response to the query, and
instructing the call control device to forward the connection request signal to the address obtained,
wherein, when the connection request signal received from the call control device is forwarded based on the instruction from the inter-network connection control device, the inter-network connection control device transmits the connection request signal to the other communication network,
wherein in each network of the interconnected network, session control is executed by a Session Initial Protocol (SIP) and the inter-network connection control device is installed at a boundary portion of a communication network of the interconnected network, and
wherein the telephone number is a telephone number conforming to E. 164, and the address is a SIP Uniform Resource Identifier (URI) or an IP address.

4. A connection control method to be executed by a communication system including an inter-network connection control device to be used in an interconnected network, and a call control device included in a specific communication network in the interconnected network, the connection control method comprising:
receiving, by the call control device, a connection request signal transmitted from a user equipment;
transmitting, by the call control device, the connection request signal to another network, based on a destination telephone number included in the connection request signal;
receiving, by the inter-network connection control device, the connection request signal,
querying, by the inter-network connection control device, an address resolution device for an address corresponding to the destination telephone number included in the connection request signal,
obtaining, by the inter-network connection control device, the address from the address resolution device;
instructing, by the inter-network connection control device, the call control device to forward the connection request signal to the address obtained; and
forwarding, by the call control device, the connection request signal to the address in accordance the instruction, wherein, when the connection request signal received from the call control device is forwarded based on the instruction from the inter-network connection control device, the inter-network connection control device transmits the connection request signal to the other communication network, wherein in each network of the interconnected network, session control is executed by a Session Initial Protocol (SIP) and the inter-network connection control device is installed at a boundary portion of a communication network of the interconnected network, and wherein the telephone number is a telephone number conforming to E. 164, and the address is a SIP Uniform Resource Identifier (URI) or an IP address.

\* \* \* \* \*